US011304080B2

(12) United States Patent
Kahtava et al.

(10) Patent No.: US 11,304,080 B2
(45) Date of Patent: Apr. 12, 2022

(54) METHODS, BASE STATION, MOBILE NODE AND RELAY NODE

(71) Applicant: SONY CORPORATION, Tokyo (JP)

(72) Inventors: Jussi Tapani Kahtava, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/543,407

(22) PCT Filed: Jan. 6, 2016

(86) PCT No.: PCT/EP2016/050125
§ 371 (c)(1),
(2) Date: Jul. 13, 2017

(87) PCT Pub. No.: WO2016/116289
PCT Pub. Date: Jul. 28, 2016

(65) Prior Publication Data
US 2017/0374575 A1    Dec. 28, 2017

(30) Foreign Application Priority Data
Jan. 21, 2015 (EP) .................................... 15151967

(51) Int. Cl.
*H04W 24/10* (2009.01)
*H04W 48/16* (2009.01)
*H04W 40/22* (2009.01)

(52) U.S. Cl.
CPC ........... *H04W 24/10* (2013.01); *H04W 40/22* (2013.01); *H04W 48/16* (2013.01)

(58) Field of Classification Search
None
See application file for complete search history.

(56) References Cited

U.S. PATENT DOCUMENTS 8,737,297 B2    5/2014    Reznik et al.
8,842,599 B2    9/2014    Osseiran et al.
(Continued)

OTHER PUBLICATIONS

"Technical Report $3^{rd}$ Generation Partnership Project; Technical Specification Group Radio Access Network; Small cell enhancements for E-UTRA and E-UTRAN—Physical layer aspects (Release 12)," 3GPP TR 36.872 V12.1.0, Dec. 2013, (100 pages).

(Continued)

*Primary Examiner* — Joseph E Avellino
*Assistant Examiner* — The Hy Nguyen
(74) *Attorney, Agent, or Firm* — Xsensus LLP

(57) ABSTRACT

A method of obtaining link measurements in a mobile telecommunications system, the system including a base station configured to communicate with at least one terminal and one or more relay nodes configured to relay downlink and/or uplink transmissions between the at least one terminal and the base station. The method includes: sending, by the base station and to a mobile node, measurement instructions including a list identifying one or more relay nodes for measuring link quality, wherein the mobile node is one of the at least one terminal and the one or more relay nodes; and receiving, at the base station and from the mobile node, a list of one or more link measurements, wherein a link measurement measures a link quality for a link between the mobile node and one of the relay nodes identified in the list sent by the base station.

16 Claims, 9 Drawing Sheets

(56) References Cited

U.S. PATENT DOCUMENTS

| | | | |
|---|---|---|---|
| 9,521,565 B2* | 12/2016 | Tenny | H04W 24/08 |
| 2005/0201296 A1 | 9/2005 | Vannithamby et al. | |
| 2010/0142433 A1 | 6/2010 | Womack et al. | |
| 2011/0026429 A1 | 2/2011 | Ben Slimane et al. | |
| 2011/0053602 A1* | 3/2011 | Moberg | H04W 52/287 |
| | | | 455/450 |
| 2013/0044627 A1* | 2/2013 | Jen | H04B 7/2606 |
| | | | 370/252 |
| 2013/0178150 A1* | 7/2013 | Park | H04W 84/12 |
| | | | 455/11.1 |
| 2013/0235745 A1* | 9/2013 | Zhang | H04W 72/08 |
| | | | 370/252 |
| 2014/0056163 A1* | 2/2014 | Kwon | H04W 24/10 |
| | | | 370/252 |
| 2014/0079022 A1* | 3/2014 | Wang | H04W 76/15 |
| | | | 370/331 |
| 2015/0031367 A1* | 1/2015 | Singh | H04W 36/14 |
| | | | 455/437 |
| 2015/0215057 A1* | 7/2015 | Knowles | H04W 64/00 |
| | | | 455/3.05 |
| 2015/0236777 A1 | 8/2015 | Akhtar et al. | |
| 2015/0312788 A1* | 10/2015 | Delsol | H04W 84/047 |
| | | | 370/252 |
| 2015/0327265 A1* | 11/2015 | Lee | H04W 72/0446 |
| | | | 370/311 |
| 2016/0021668 A1* | 1/2016 | Hirai | H04W 24/08 |
| | | | 370/252 |
| 2017/0078067 A1* | 3/2017 | Sun | H04W 72/0453 |
| 2017/0086156 A1* | 3/2017 | Klatt | H04W 76/14 |

OTHER PUBLICATIONS

Peyman Pahlevani, et al, "Novel concepts for device-to-device communication using network coding", IEEE Communications Magazine, vol. 52, No. 4, Apr. 2014, (3 pages) (copy not available; submitting English Abstract only).

Muriel Medrad, et al., "Network Coding: Fundamentals and Applications," Academic Press $1^{st}$ Edition, Oct. 28, 2011, (6 pages) (copy not available; submitting English Abstract only).

Harri Holma, et al., "LTE for UMTS OFDMA and SC-FDMA Based Radio Access," John Wiley & Sons Limited, Jan. 2010, (4 pages).

International Search Report dated May 25, 2016 in PCT/EP2016/050125 filed Jan. 6, 2016.

* cited by examiner

METHODS, BASE STATION, MOBILE NODE AND RELAY NODE

CROSS-REFERENCE TO RELATED APPLICATIONS

The present application claims priority to European Patent Application 15 151 967.5 filed in the European Patent Office on Jan. 21, 2015, the entire contents of which being incorporated herein by reference.

TECHNICAL FIELD OF THE DISCLOSURE

The present disclosure relates to methods, base stations, mobile nodes and relay nodes, and more broadly to measuring link quality in a heterogeneous environment.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a number of new infrastructure architectures involving a variety of class of devices, of wireless access point units and of applications which may be target to different data rates, coverage areas or transmission powers. Unlike a conventional third or fourth generation communications device such as a smartphone, an MTC-type terminal is preferably relatively simple and inexpensive, having a reduced capability. Examples of recent developments include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include relay nodes which provide assistance to local terminal communicating with a base station.

Whilst it can be convenient to have different systems addressing different needs from different mobile network users, the additions of new infrastructure and new services can also create an infrastructure problem, which is not desirable in a mobile network.

SUMMARY OF THE DISCLOSURE

According to an example embodiment of the present technique there is provided a method of obtaining link measurements in a mobile telecommunications system, the system comprising a base station configured to communicate with at least one terminal and one or more relay nodes configured to relay downlink and/or uplink transmissions between the at least one terminal and the base station. The method comprises: sending, by the base station and to a mobile node, measurement instructions wherein the measurement instructions comprise a list identifying one or more relay nodes for measuring link quality, wherein the mobile node is one of the at least one terminal and the one or more relay nodes; receiving, at the base station and from the mobile node, a list of one or more link measurements, wherein a link measurement measures a link quality for a link between the mobile node and one of the relay nodes identified in the list sent by the base station.

According to another example embodiment of the present technique, there is provided a base station for obtaining link measurements in a mobile telecommunications system, the system comprising the base station being configured to communicate with at least one terminal and one or more relay nodes configured to relay downlink and/or uplink transmissions between the at least one terminal and the base station. The base station is configured to: send, to a mobile node, measurement instructions wherein the measurement instructions comprise a list identifying one or more relay nodes for measuring link quality, wherein the mobile node is one of the at least one terminal and the one or more relay nodes; receive, from the mobile node, a list of one or more link measurements, wherein a link measurement measures a link quality for a link between the mobile node and one of the relay nodes identified in the list sent by the base station and wherein, the mobile node is configured to report a link measurement only in the event that the link measurement is above a threshold.

According to a further example embodiment of the present technique, there is provided circuitry for a base station for obtaining link measurements in a mobile telecommunications system, the system comprising the base station being configured to communicate with at least one terminal and one or more relay nodes configured to relay downlink and/or uplink transmissions between the at least one terminal and the base station. The circuitry comprises a controller element and a transceiver element configured to operate together to: send, to a mobile node, measurement instructions wherein the measurement instructions comprise a list identifying one or more relay nodes for measuring link quality, wherein the mobile node is one of the at least one terminal and the one or more relay nodes; receive, from the mobile node, a list of one or more link measurements, wherein a link measurement measures a link quality for a link between the mobile node and one of the relay nodes identified in the list sent by the base station and wherein, the mobile node is configured to report a link measurement only in the event that the link measurement is above a threshold.

According to yet another example embodiment of the present technique, there is provided a method of reporting link quality, in a mobile telecommunications system, the system comprising a base station configured to communicate with at least one terminal and one or more relay nodes configured to relay downlink and/or uplink transmissions between the at least one terminal and the base station, wherein the method is for reporting link quality at a mobile node, a mobile node being one of the at least one terminal and the one or more relay nodes. The method comprises: receiving measurement instructions from the base station, wherein the measurement instructions comprise a list identifying one or more relay nodes for measuring link quality; generating a measurement report by, for each of the one or more relay nodes identified in the list and different from the mobile node: (a) attempting a discovery process for the relay node; (b) in the event that the relay node has been discovered, measuring the link quality between the mobile node and the relay node; and reporting, to the base station, a link quality indicator for each discovered relay node for which the measured link quality is above a threshold.

According to a further example embodiment of the present technique, there is provided a mobile node for reporting link quality, in a mobile telecommunications system, the system comprising a base station configured to communicate with at least one terminal and one or more relay nodes configured to relay downlink and/or uplink transmissions between the at least one terminal and the base station. The mobile node is one of the at least one terminal and the one or more relay nodes and is configured to: receive measurement instructions from the base station, wherein the measurement instructions comprise a list identifying one or more relay nodes for measuring link quality; generate a measurement report by, for each of the one or more relay nodes identified in the list and different from the mobile node: (a) attempt a discovery process for the relay node; and (b) in the event that the relay node has been discovered, measure the link quality between the mobile node and the relay node; and report, to the base station, a link quality indicator for each discovered relay node for which the measured link quality is above a threshold.

According to another example embodiment of the present technique, there is provided circuitry for a mobile node for reporting link quality, in a mobile telecommunications system, the system comprising a base station configured to communicate with at least one terminal and one or more relay nodes configured to relay downlink and/or uplink transmissions between the at least one terminal and the base station, wherein the mobile node is one of the at least one terminal and the one or more relay nodes. The circuitry comprises a controller element and a transceiver element configured to operate together to: receive measurement instructions from the base station, wherein the measurement instructions comprise a list identifying one or more relay nodes for measuring link quality; generate a measurement report by, for each of the one or more relay nodes identified in the list and different from the mobile node: (a) attempt a discovery process for the relay node; (b) in the event that the relay node has been discovered, measure the link quality between the mobile node and the relay node; and report, to the base station, a link quality indicator for each discovered relay node for which the measured link quality is above a threshold.

According to a further example embodiment of the present technique, there is provided a method of generating a signal for link measurement reports in a mobile telecommunications system, the system comprising a base station configured to communicate with at least one terminal and one or more relay nodes configured to relay downlink and/or uplink transmissions between the at least one terminal and the base station, wherein the method is for generating a signal at a first relay node. The method comprises: receiving, at the first relay node, measurement instructions from the base station, wherein the measurement instructions comprise a list identifying at least the first relay node for measuring link quality; identifying a timing for measuring link quality with the first relay node; and generating a sounding signal at the first relay node at a time corresponding to the timing for measuring link quality with the first relay node.

According to yet another example embodiment of the present technique, there is provided a relay node for generating a signal for link measurement reports in a mobile telecommunications system, the system comprising a base station configured to communicate with at least one terminal and one or more relay nodes configured to relay downlink and/or uplink transmissions between the at least one terminal and the base station, wherein the relay node is one of the one or more relay nodes. The relay node is configured to: receive, at the first relay node, measurement instructions from the base station, wherein the measurement instructions comprise a list identifying at least the first relay node for measuring link quality and comprise timing information identifying a timing for measuring link quality with the first relay node; and generate a sounding signal at the first relay node at a time corresponding to the timing for measuring link quality with the first relay node.

According to a further example embodiment of the present technique, there is provided circuitry for a relay node for generating a signal for link measurement reports in a mobile telecommunications system, the system comprising a base station configured to communicate with at least one terminal and one or more relay nodes configured to relay downlink and/or uplink transmissions between the at least one terminal and the base station wherein the relay node is one of the one or more relay nodes. The circuitry comprises a controller element and a transceiver element configured to operate together to: receive, at a relay node measurement instructions from the base station, wherein the measurement instructions comprise a list identifying at least the first relay node for measuring link quality and comprise timing information identifying a timing for measuring link quality with the first relay node; and generate a sounding signal at the first relay node at a time corresponding to the timing for measuring link quality with the first relay node.

Accordingly, the embodiments of the present technique can provide an arrangement where measurements on various links can be provided in a network including base stations, relay nodes and terminals.

Various further aspects and features of the present technique are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
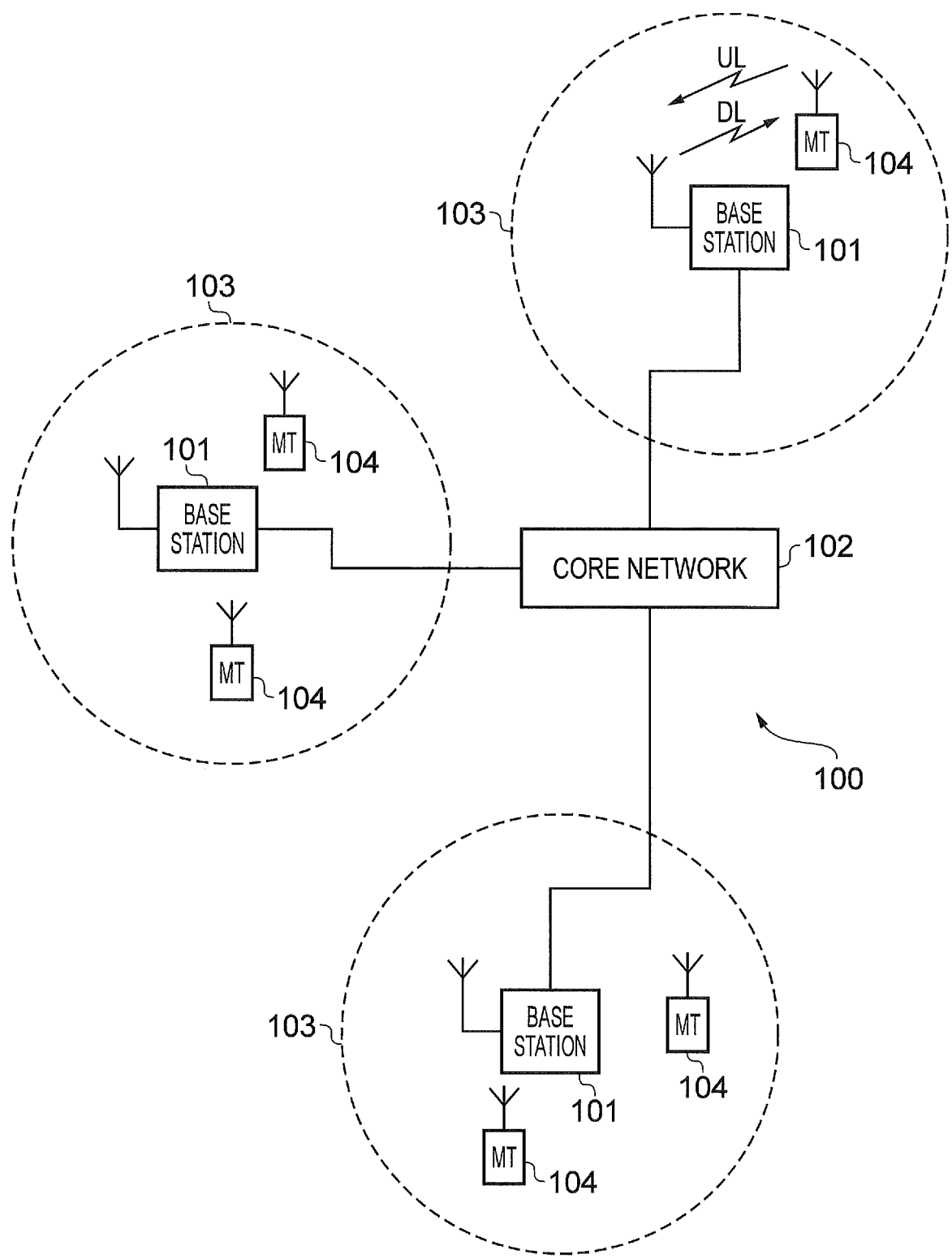
FIG. 1 provides a schematic diagram of a mobile communications system according to an example of an LTE standard.

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

FIG. 1 provides a schematic diagram illustrating some basic functionality of a conventional mobile telecommunications network, using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, mobile terminal, mobile device, terminal, mobile radio, and so forth. Base stations may also be referred to as transceiver stations/nodeBs/e-nodeBs/eNodeB, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 101 may be realized as any other types of base stations such as a NodeB and a base transceiver station (BTS). The base station 101 may include a main body (that is also referred to as a base station apparatus) configured to control radio communication, and one or more remote radio heads (RRH) disposed in a different place from the main body. In addition, various types of terminals, which will be described below, may each operate as the base station 101 by temporarily or semi-persistently executing a base station function.

Any of the communications devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 104 may also be realized as a terminal (that is also referred to as a machine type communication (MTC) terminal) that performs machine-to-machine (M2M) communication. Furthermore, the terminal apparatus 104 may be a radio communication module (such as an integrated circuit module including a single die) mounted on each of the terminals In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small can therefore be the cell or coverage provided by a small cell base station. In other examples, the term small cell can also refer to a component carrier when more than one component carrier are available.

Moreover, mobile networks can also include Relay Nodes (RN) which can further increase the complexity of the mobile system and of the reduction of interference in a small cell network. Relay technologies are known generally to provide an arrangement for receiving signals from a base station and for retransmitting the received signals to a UE in a mobile communications network, or to receive signals transmitted from a UE for re-transmission to a base station of a mobile communications network. The aim of such relay nodes is to try to extend a radio coverage area provided by a mobile communications network to reach communications devices which would otherwise be out of range of the mobile communications network or to improve the ratio of successful transmissions between a terminal and a base station.

A mobile network which includes a variety of base stations and/or relay nodes (e.g. macro-cell base stations, small cell base stations and/or relays) is sometimes referred to as a heterogeneous network.

Heterogeneous networks that would have very dense footprint of access points will no longer be designed and set up in a coordinated fashion by a single mobile network operator. Due to the sheer number of small cells needed their installation will happen much more in an ad hoc fashion, with end users and other non-MNO entities also installing small cells. The overall network management would still be done by an operator for all small cells using that MNO's assigned frequency band. This evolution from today's operator installed networks to more unplanned ad hoc networks is what we refer to as 'dense network' in this description.

Figure 2:
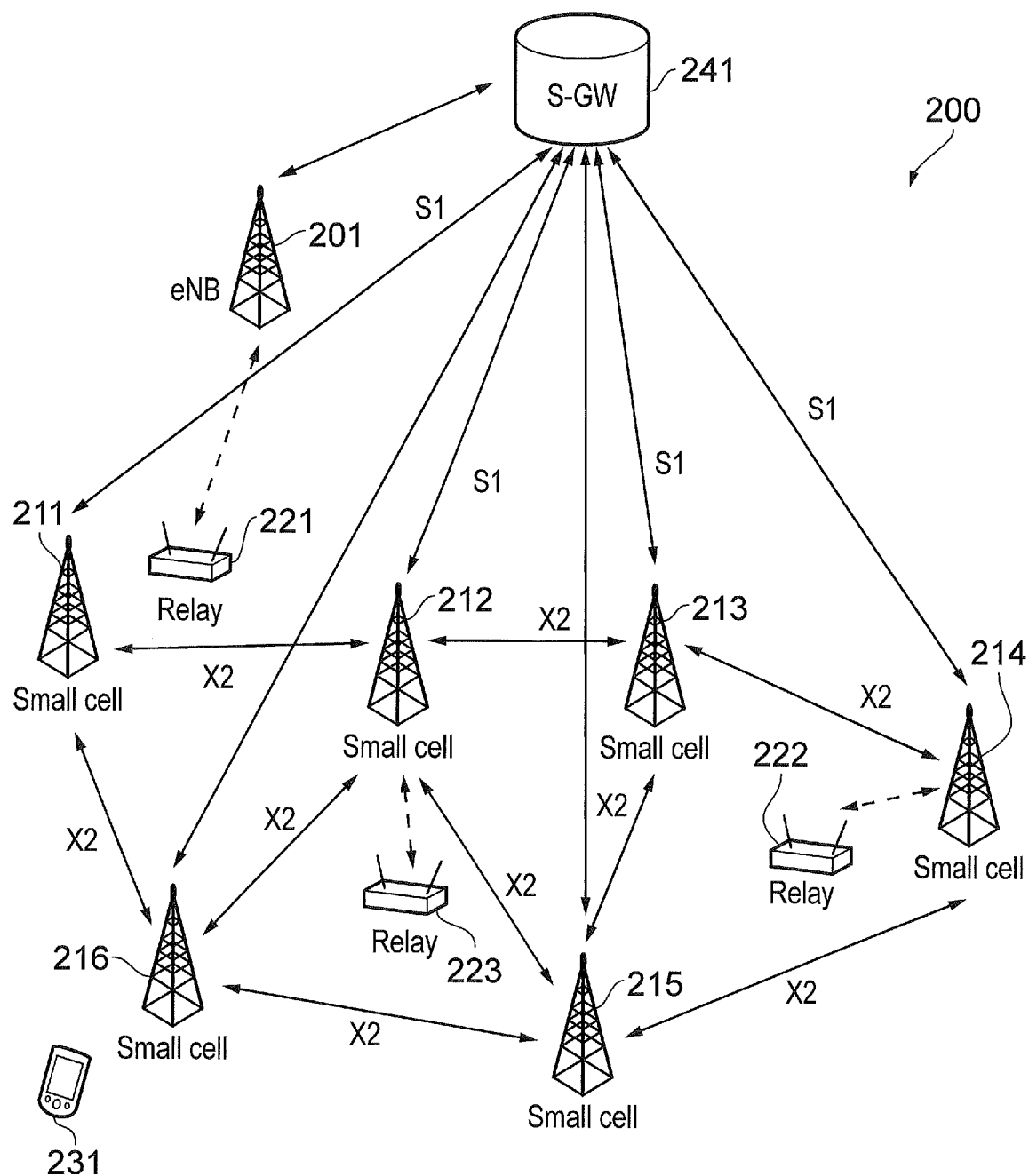
FIG. 2 illustrate an example system for communicating with at least a terminal in a heterogeneous network.

FIG. 2 illustrates an example heterogeneous system 200 for communicating with at least a terminal 231. In this system 200, a base station 201 provides a macrocell and six base stations 211-216 provide small cell coverage, potentially overlapping with the coverage of the base station 201. Additionally, three RN 221-223 are provided and are operating with base stations 201, 214 and 212, respectively. A relay node can generally be defined as a wireless radio access point for relaying transmission and which thus does not implement all of the functionalities of a base station. It is in general not directly connected to the core network but uses wireless access (inband or outband) for backhaul link to connect with a base station. In other examples, the backhaul link may also be provided over a wired connection. This is in contrast to a small cell base station which, as mentioned above, can generally operate like a base station and is thus connected to the core network, as illustrated by the arrows between the small cell base stations 211-216 and the Serving Gateway "S-GW" in FIG. 2. Relay nodes may also send or receive data with the terminals or base stations which can also add to the complexity of dealing with interference in an environment as illustrated in FIG. 2.

Figure 3:
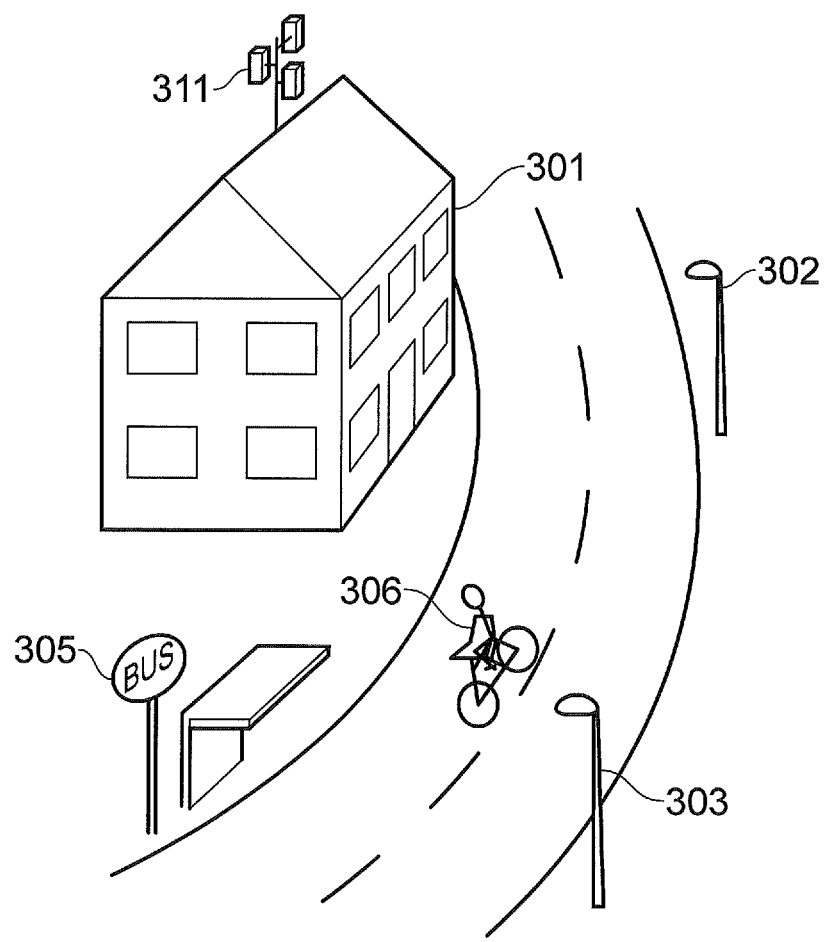
FIG. 3 illustrates an example of a heterogeneous environment.

Another example of a heterogeneous environment is illustrated in FIG. 3, where a macrocell base station 311 is provided in the same area as small cells provided by a base station 301 in or in the vicinity of a building, by a base station 302 in a first lamppost, by a base station 303 in a second lamppost, by a base station 305 provided in a bus stop and by a mobile base station 306 provided in a cyclist back-pack. In another example, the infrastructure unit 303 and 302 in lamp posts may be relay nodes relaying data in the uplink and/or downlink to the macrocell base station 311 or to another infrastructure unit (e.g. another relay node). In this example, the interference and link quality experience can vary greatly depending on traffic and on time: the cyclist may enter an interference/poor link quality zone and later leave this are, while the base station 301, if associated with an office, may potentially only be used during office hours and may be turned off during the rest of the day or the rest of the week.

In such a heterogeneous network, a terminal may be able to communicate via a plurality of wireless links which can each have different qualities. However, conventional link measurements are only provided for the base station providing the cell on which the terminal is camping. For example, if a terminal is connected to a base station 201, 211 or 311, the terminal will measure and report link quality for the link between the terminal and this base station. When contemplating a handover, the terminal may report on a neighbouring base station but remains unable to report on link quality for other infrastructure unit within the cell it is currently camping on. Additionally, a base station can be detected by a terminal using conventional cell detection mechanism, using signals provided by the base station. The terminal can also measure the strength and/or quality of the link with the base station using these signals, for example when selecting a cell. On the other hand, other infrastructure units, such as relay nodes, do not act as a base station and can therefore not provide these signals. As a result, the terminal finds itself unable to detect, or measure links with, relay nodes. It is therefore desirable to address this problem.

Figure 4:
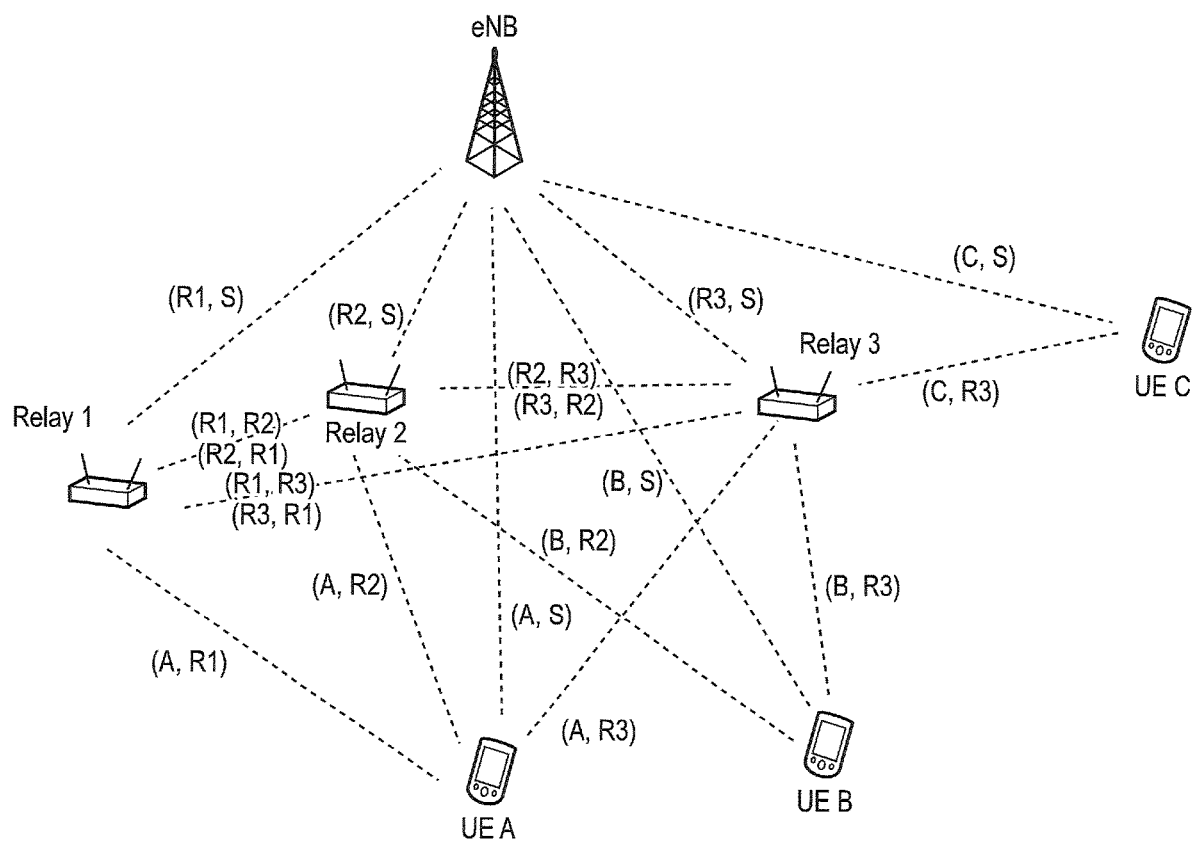
FIG. 4 provides a schematic illustration of a heterogeneous network.

FIG. 4 provides a schematic illustration of a heterogeneous network showing the variety of links that can be established between two elements of the groups formed of the terminals and the infrastructure units (base stations and relay nodes). This group includes here one base station (eNB); three relays Relay 1 or R1, Relay 2 or R2 and Relay 3 or R3; and three terminals UE A, UE B and UE C. The topology of the network can be seen or represented as a directed graph G which consists of a vertex set V and an edge set E, i.e. G=(V,E). The vertices are here one of a terminal or an infrastructure unit and the edges are directed edges corresponding to a communication link between two vertices. As an illustration, in the example of FIGS. 4, R1 and R2 (two vertices) have a bi-directional communication link. That is, two directed communication links are in fact provided, one from R1 to R2 and one from R2 to R1. This has been represented in FIG. 4 with "(R1, R2)" which denotes the first edge and "(R2, R1)" which denotes the other edge. The head and tail of an edge e=(v',v) is denoted by v=head(e) and v'=tail(e). For example, tail(R1,R2)=R1 and head(R1,R2)=R2.

Figure 5:
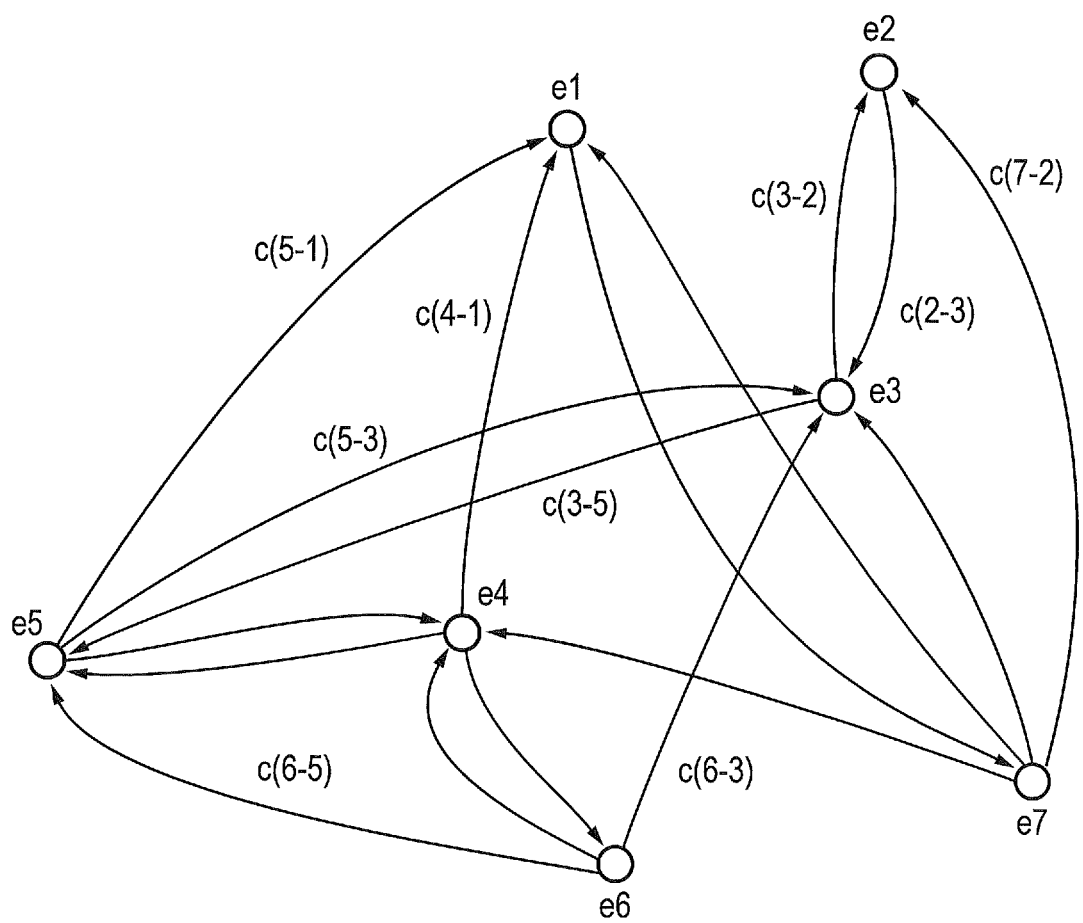
FIG. 5 illustrates a graph representing an example network topology.

FIG. 5 illustrates a graph representing an example network topology. This graph illustrates seven vertices e1-e7 with (directed) edges between some of these vertices. Each of the edge (en-em) of the graph is associated with a capacity c(en-em) which represents the capacity of the link from the tail vertex en to the head vertex em of link (en-em). In the interest of clarity and legibility, only some of the capacities of the edges of the graph of FIG. 5 have been represented in this figure. From a source to a sink of a graph, there may be no path available, one path only or a plurality of paths. Generally, it is considered that there is a possible path from the source to the sink if there is a chain of edges starting from the source and leading to the sink and if, for each pair of edges (en-em) along the path, the condition c(en-em)>0 is met. In other words, there is available capacity for each edge along the path from the source to the sink.

The best path from a source to a sink in a graph G will depend on the links or edges available between the vertices and on the capacity for each of these links. Different algorithms may be used to try to identify the best path or a desirable path, such as the Ford-Fulkerson algorithm which, at a recurrence level, recursively attempts to identify any possible path from the source to the sink in the residual network which is based on the original network (or graph) and on the previously identified paths. However, for this algorithm or other algorithms to be used, the capacities of the links or edges of the graphs have to be known or estimated. As previously mentioned, there is currently no means available for the terminal to measure the link quality between an infrastructure unit which does not operate as a base station and a terminal. The network can therefore not plan effectively which path from a terminal to the network may be the best path at a point in time and in view of the network topology.

Figure 6:
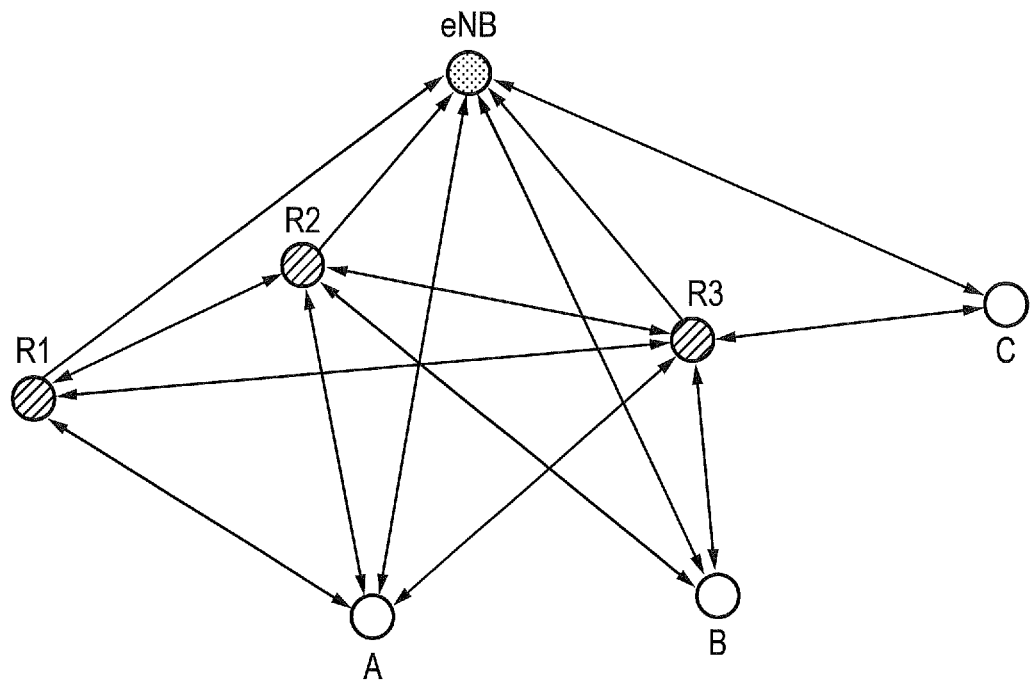
FIG. 6 illustrates another graph representing an example network topology.

FIG. 6 illustrates another graph representing a network topology. In the interest of legibility, when two edges (en-em) and (em-en) are provided between vertices en and em, the two separate edges have been represented as a single double-sided arrow. Of course the skilled person will recognise that the graph could equally be represented using single-sided arrows only, as used for example in FIG. 5 discussed above. In this graph, a terminal is represented with a blank vertex, a relay node with a hashed vertex and a base station with a chequered vertex. The type of node or vertex will not necessarily impact how the algorithm is applied as such, it will however impact the links or edges from or to this vertex. For example, in some cases, a terminal could be the head and/or tail of an edge, but only with a relay or base station at the other end of the edge; a relay could be a head and/or tail with any other type of vertex at the other end of the edge; and a base station could be a head and/or tail but only with only a relay or terminal at the other end of the edge. In other examples, the limitations on the links can be different. For example, if D2D (device-to-device) communications are available, a terminal could have a link or edge to another terminal. This type of configuration can also be used with the teachings of the present disclosure.

In accordance with the present disclosure, there is provided methods and arrangements where the quality of a link with one or more relay nodes can be estimated and reported to the base station by terminals and any other relay nodes as appropriate.

Figure 7:
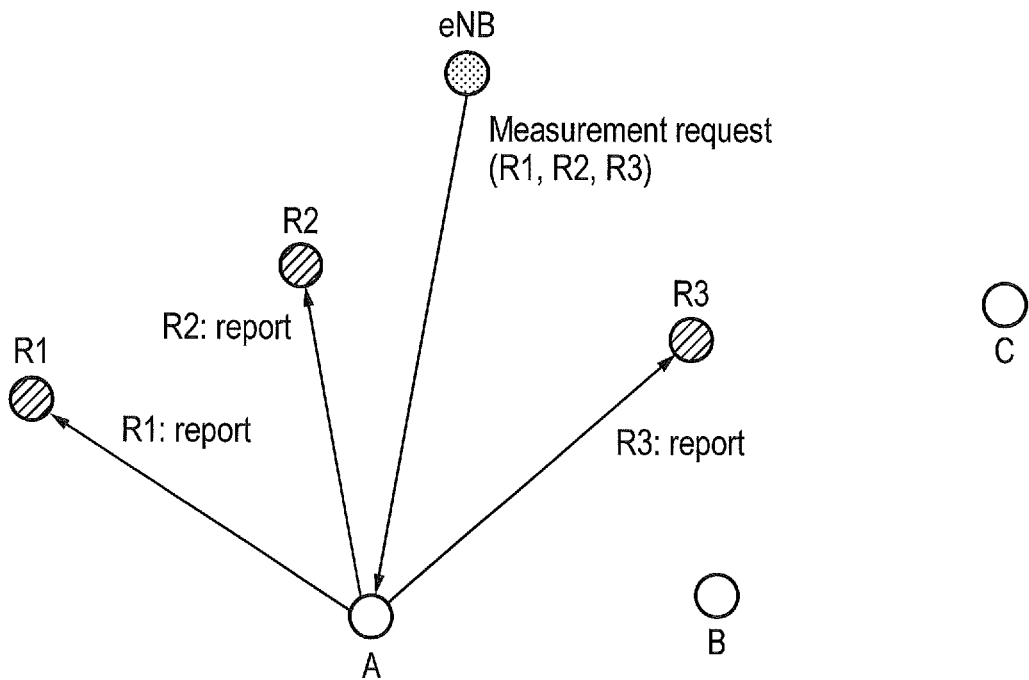
FIG. 7 illustrates an example application of a method in accordance with the present disclosure.

FIG. 7 illustrates an example application of a method in accordance with the present disclosure, in the example network of FIG. 6. In this example, the base station (eNB) sends measurement instructions in the form of a measurement request for terminal A to report on the link quality with relay nodes R1, R2 and R3. The base station, or another network unit instructing the base station, may for example have a map of relay nodes which are operating within its cell and which may assist terminals camping on its cell with downlink and/or uplink transmissions. Although only one measurement request (to terminal A) has been illustrated in FIG. 7, the base station may send the same measurement request to more than one mobile node (a terminal or a relay node), either individually or as a broadcasted message, and may also send one or more different measurement requests to other mobile nodes.

Once terminal A has received the measurement instructions from the base station, it attempts to discover relay nodes based on the measurement instructions. In this example, terminal A receives a measurement request for three relay nodes R1-R3 and thus attempts to discover each of relays R1-R3. The terminal then measures the link quality with each of the relay nodes previously discovered, i.e. R1-R3 in this case. The type of measurement to be carried out can in some example include a RSRP measurement, a RSRQ measurement, a RSSI measurement, a RSRP-like measurement (e.g. power detected as received from the relay node), RSRQ-like measurement (e.g. a ratio of a power detected as received from the relay node to a total power received on the appropriate frequency band) or a RSSI-like measurement (e.g. total power received on the appropriate frequency band), or any other suitable type of measurement. Also the type of measurement may be pre-configured in the terminal, may have been previously instructed by the network (e.g. from or via the base station), may be indicated in the measurement instructions, or any suitable combination of these. The type of measurement may for example specify whether the link quality is measured only once or multiple times, averaging across a sequence of measurement outcomes. It may also indicate whether the measurement is done once across a full bandwidth or in some sequence covering the bandwidth in smaller slices.

The terminal A then reports to the base station the link quality only for these links for which the link quality is above a threshold parameter. The threshold parameter may be pre-configured in the terminal, may have been previously instructed by the network (e.g. via RRC signalling from the base station), may be indicated in the measurement instructions, or any suitable combination of these and any other suitable method of configuration. In the example of FIG. 7, each of relay nodes R1-R3 has a link quality which is above the threshold parameter such that terminal A reports the link quality for the links (or edges in graph terminology) with each of R1-R3. Terminal A may for example report a link quality indicator for each of R1-R3 by sending a single report to the base station for all three relay nodes, or by sending the link quality indicators in a plurality of report, e.g. in separate reports. The base station can then identify the relay nodes with which the terminal has a good connection and can use this information when making network planning decisions, for example to decide how the relay nodes can assist in downlink and/or uplink transmissions. For example, when applying graph theory to the network topology of the example network of FIG. 6, the base station can now estimate the link quality between A and the relay node, which can be used as a "capacity" for the corresponding edge when estimating which is likely to be the best route for transmissions.

In the present disclosure, the expression "measurement set" will refer to the relay node or other mobile node for which the base station requests a link quality measurement in the measurement instructions. The expression "active set" will refer to the set of relay nodes or mobile nodes that the terminal or mobile node receiving the measurement instructions has been able to discover, while "reporting set" refers to the mobile nodes that have been discovered and for which the link quality of above the threshold parameter. In other words, the active set is a subset of the measurement set and the reporting set is a subset of the active set.

Figure 8:
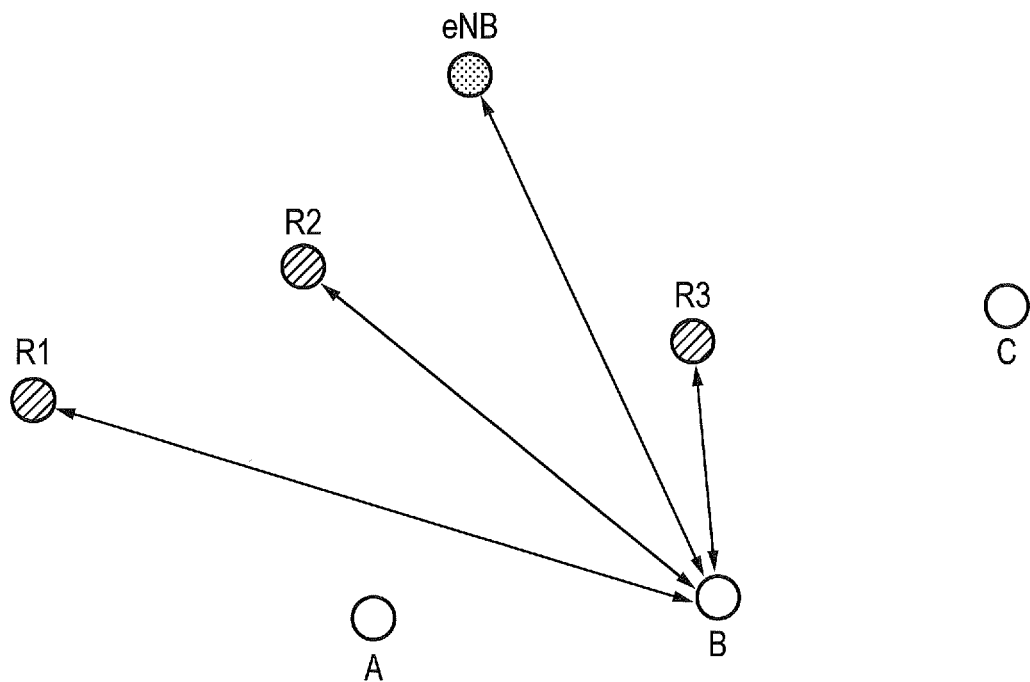
FIGS. 8-9 illustrate another example application of a method in accordance with the present disclosure.
Figure 9:
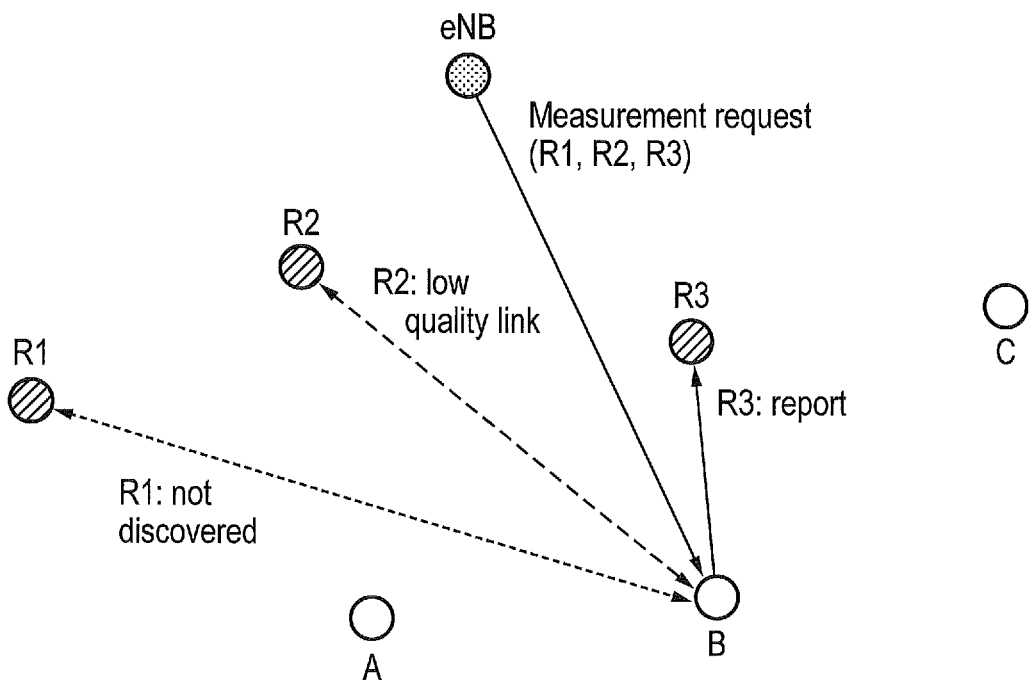

FIGS. 8-9 illustrate another example application of a method in accordance with the present disclosure, in the example network of FIG. 6. In this example, the base station (eNB) sends measurement instructions in the form of a measurement request for terminal B to report on the link quality with relay nodes R1, R2 and R3. FIG. 8 shows all potentially possible links originating or terminating at terminal B in the network of FIG. 6. The base station is for example aware that relay nodes R1-R3 are in the area of or in the vicinity of its cell such that terminal B, which is camping on its cell, can potentially be assisted by any of relays R1-R3. As illustrated in FIG. 9, the base station therefore sends measurement instructions in the form a measurement request to terminal B. Terminal B is instructed to report on the link quality for a measurement set of relay nodes R1-R3 or {R1, R2, R3}. Once terminal B has received the instructions, it will attempt to discover each of the relay in the measurement set. In the example of FIGS. 8-9, terminal B is too far away from relay R1 to detect the relay or to discover the relay but the terminal is close enough to discover both relays R1 and R2. Thus the measurement set is {R2, R3}. Terminal B also measures the link quality for each of the relay node in the measurement set, i.e. for R2 and R3. In this example, following the measurements, terminal B detects that the link quality for R2 is below the threshold parameter while the link quality for R3 is above the threshold parameter. Thus the reporting set is {R3} only. In other words, even though relay R2 can be detected, because of the low link quality with it, the terminal will not report the link quality to the base station and, in this case, only the link with R3 is worth reporting to the base station. Thus the base station is only aware of the link quality between terminal B and relay R3 is that the terminal did not report on R1 or R2. As the base station is aware of the measurement set and of the reporting set, it can derive from the difference between these two sets that the other relay node(s) which are in the measurement set and not in the reporting set that these relay nodes are either not discoverable by the terminal or have been discovered but with only a low link quality. In other words, the base station knows that these relay nodes will not provide suitable paths for routing transmissions for terminal B (and that the relay nodes in the reporting set can provide such paths) and knows, for the other relay nodes, the quality of the link which can be used for routing transmissions via relay nodes in the network.

In the examples of FIGS. 7-9, only terminals have received measurement instructions from the base station, however these figures are merely illustrations and are not intended to limit the scope of the invention which is defined by the claims. For example, relay nodes may also receive measurement instructions and transmit quality link reports, e.g. reports including quality link indicators, to the base station. In other words, the discussion and teachings above apply equally to cases where the measurement request is sent to any of relay nodes R1-R3.

In one example, the base station may broadcast measurement instructions to every mobile node (terminal or relay node) in its cell with a measurement set of R1-R3. All terminals will attempt to discover and measure the link quality for each of R1-R3. For the relay nodes, each node will attempt to discover and measure the link quality for each of R1-R3 other than itself. The relay nodes may otherwise behave in a manner similar to that of the terminals described above.

Figure 10:
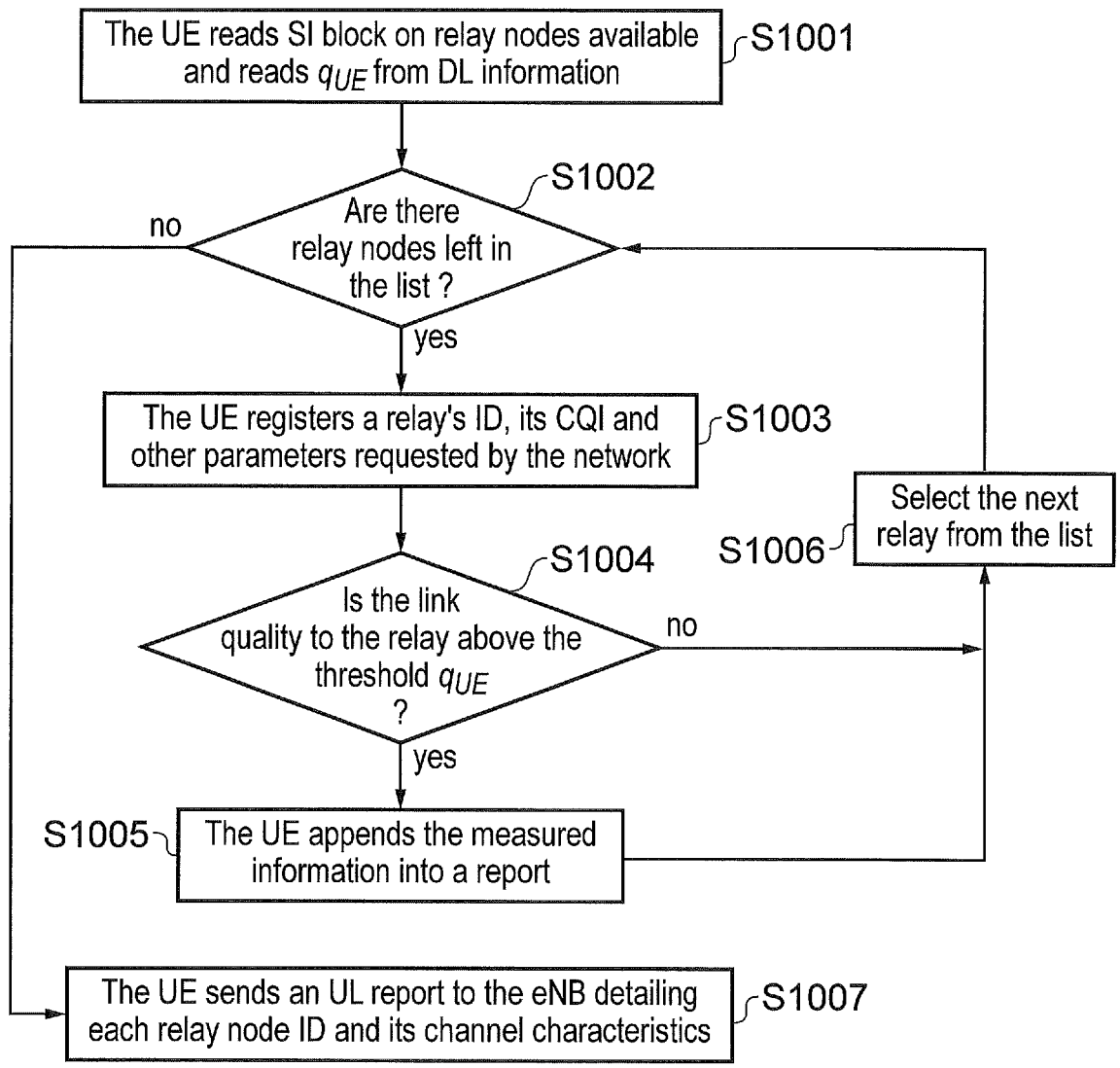
FIG. 10 illustrates an example method for a terminal to report measurements to the base station in accordance with the present disclosure.

FIG. 10 illustrates an example method for a terminal to report measurements to the base station in accordance with an example of the present disclosure. First, at step S1001, the terminal obtains information on the relay nodes in the area and on the threshold parameter for reporting to the base station. In this example, the terminal reads this information from SI blocks transmitted by the base station. The list of relay nodes communicated by the base station identifies the measurement set and the threshold parameter $q_{UE}$ is for the terminal to identify the reporting set from the active set, as will be discussed below. At step S1002, the terminal determines whether there are any relay nodes left in the measurement set or list communicated by the base station. If the list still comprises at least one relay node, the method moves to step S1003 where the terminal registers the relay's identifier and, if it was able to discover the relay, its link quality measurement (e.g. its Channel Quality Indicator or "CQI") and other parameters requested by the network, if any. Then, at step S1004, the terminal determines if the link quality is above the threshold parameter $q_{UE}$ previously retrieved from the SI blocks transmitted by the base station. If the link quality is above the threshold parameter, the measurement information for the current relay node is added to a measurement report at step S1005. The terminal may also add additional information such as a relay's identifier, a time, a terminal's location, etc. As the skilled person will understand, for the first relay node for which measurement information is to be added, the method can also include a step of creating a measurement report before adding the measurement information to it, for example to include a header for the report, if any. After step S1005, or if it has been determined at step S1004 that the quality is not above the threshold parameter, the method moves to step S1006 where the next relay node in the list is selected and then moves back to step S1002. If there was no other relay node in the list, the method would then move to step S1007 and if there was one or more other relay node in the list, the method carries out steps S1003-S1006, as appropriate, for one of the one or more other relay nodes. At step S1007, the terminal sends a report previously created to the base station. This step may also include a step of finalising the report, for example to include a trailer for the report, if any. Also, in cases where the report does not include any relay nodes (e.g. if any detected relay nodes does not provide a link with a quality above the threshold parameter), the terminal may not take any action and may thus not send any report to the base station. In other cases, the terminal can send an empty report, that is, a report that does not includes any link measurement for any relay node, to confirm to the base station that it has carried out the measurement but that no relay could be detected with a good enough quality.

Using the method of FIG. 10, or another method in accordance with the present disclosure, the terminal can report to the base station on the quality of the links between the terminal and the relay node. Likewise, a relay node can report to the base station on the link quality with one or more other relay nodes using the method of FIG. 10 adapted as necessary. For example, the relay node can go through steps S1003-S1006 for all relay nodes in the list but itself. Also, whether the method of claim 10 is carried out by a terminal, by a relay node or by any other mobile node, the method steps may be carried out in a different order. For example, the mobile node may first establish which of the relay nodes in the measurement set or list received from the base station will be included in the active set of relay nodes that have been discovered or detected by the mobile node. The mobile node may then go through the active set or list to determine which of the relay nodes will be in the reporting set or list and will be included in the report to be sent to the base station.

Figure 11:
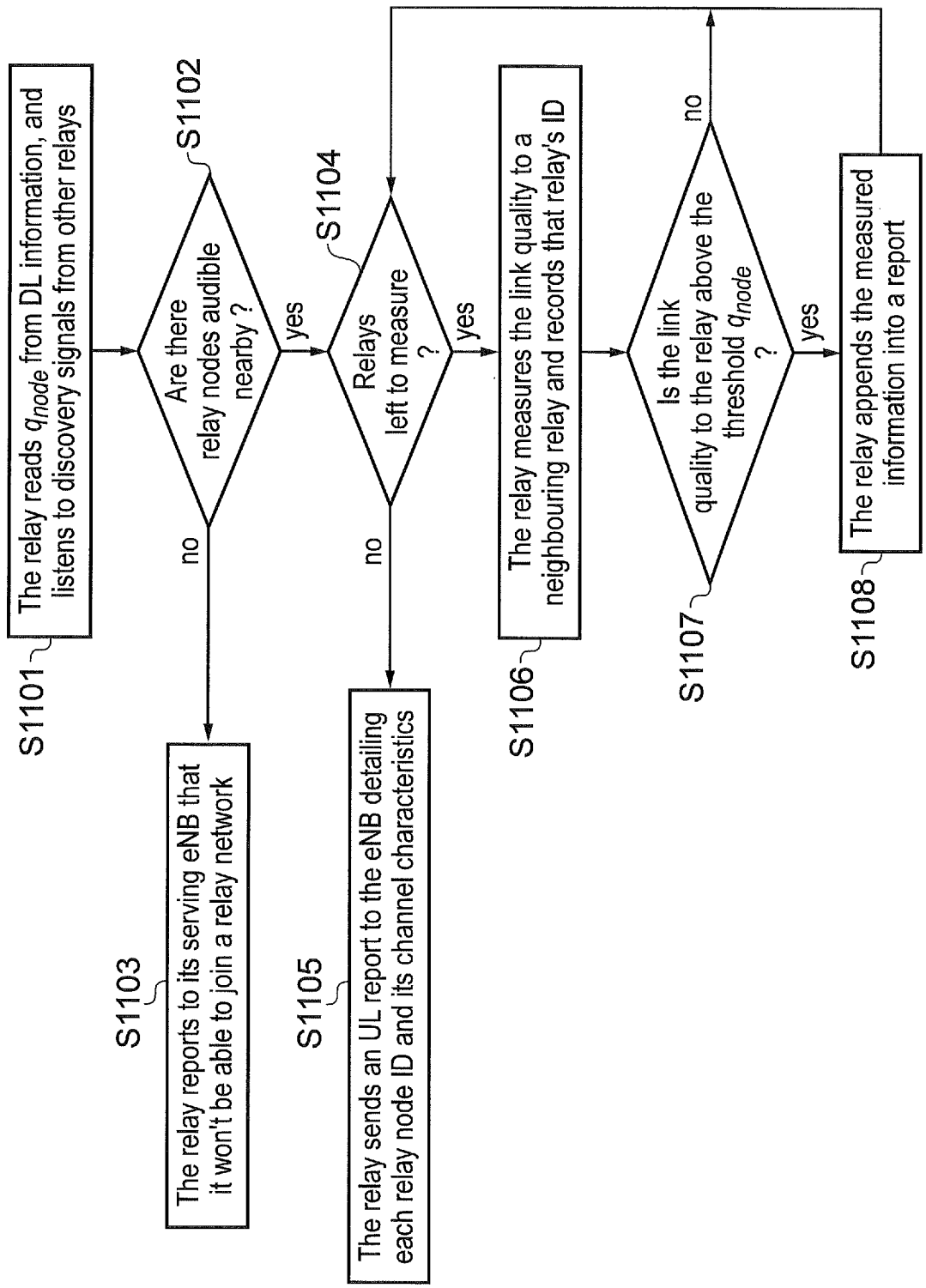
FIG. 11 illustrates an example method for a relay node to report measurements to the base station in accordance with the present disclosure.

FIG. 11 illustrates an example method for a relay node to report measurements to the base station in accordance with an example of the present disclosure, which can be carried out when a relay node is first started and is attempting to join a relay network. In this example, the relay node uses a threshold parameter $q_{node}$ to determine whether to report the link measurements for links with other relay nodes to the base station. First, at step S1101, the relay node retrieves the threshold parameter $q_{node}$ from downlink information sent by the base station and attempts to discover other relays, for example from a list of or set of relay nodes transmitted by the base station. At S1102, if it is determined that no audible relay node can be found, the relay node reports to the base station that it will not be able to join a relay network at S1103 and the method can end there. On the other hand, if at least one other relay node can be heard, the method moves to S1104 where it is determined whether there are any relays to measure. If all relay nodes have been measured, the method moves to step S1105 where the relay sends a report to the base station of the relay nodes it has detected, measured and selected for the report. As discussed above in respect of FIG. 10, in some examples, this report is only transmitted when the measurement report includes at least one relay node with a link having a high enough quality. If at step S1104 it is determined that at least one relay node has to be measured, the method moves to S1006 where the link quality with the relay node is measured. Then, at S1107, it is determined whether the measured link quality is above the threshold parameter $q_{node}$ previously obtained. If the link quality is below the threshold parameter, the method returns to step S1104 but if the link quality is above the threshold parameter, the method moves to S1108 where the measurement information is added to a report. Then the method can return to S1004 and carry out the S1104, S1106-S1108 loop as many times as necessary based on the measurement set. As the skilled person will understand, the comments above made in respect of similar steps carry out in the example method of FIG. 10 apply equally to the example method illustrated in FIG. 11, and to any other method in accordance with the present disclosure. Based on the reports received from relay nodes in its cell or vicinity, the network can decide whether to and how to configure a relay network using relay nodes which can assist the transmissions between the terminals and the base stations, in downlink and/or uplink.

There has therefore been provided an arrangement where a mobile node can report to the base station on the quality of the link for relay nodes identified by the base station.

In the present disclosure the terms relay and RN are sometimes used to refer relay nodes. Also, the term infrastructure unit, when used, refers to a base station or any other node between a terminal and a base station, such as a relay node, while the term mobile node refers to a terminal or any other node between a terminal and a base station, such as a relay node.

In the present disclosure, the method steps may be carried out in any suitable order. For example, steps may be carried in an order which differs to that used in the examples discussed above or to that used for listing steps (e.g. in the claims), whenever possible or appropriate. Thus, in some cases, some steps may be carried out in a different order, or simultaneously or in the same order. For example, and as previously mentioned, for each relay node in the measurement set, the detection/discovery, measurement and comparison with a threshold parameter can be carried out all at once for each relay node or may each be carried out for all the relevant relays before moving on to carrying out the next one for each of the relevant relays.

Also, even though the detection and measurement of a relay node have been generally described as two separate steps, they can in fact be carried out at the same time with one step achieving both detection and measurement if detected. For example, if the terminal is aware of when the relay will transmit a specific signal, such as a sounding signal (see below), the terminal can listen to the sounding signal and, if it cannot be heard then the relay has not been detected and, if it has been detected, it can be measured at the same time. Also the relay node can be detected in any suitable manner. In some examples, the terminal may use some frequency and/or timing information for detecting the relay node, for example frequency and/or timing information transmitted by the base station. The relay node may for example transmit a signal at a specific frequency and/or timing that the terminal can attempt to listen to detect the relay.

In one example, the base station communicates timing information for measurement in a relay network or a network comprising relay nodes. Based on this timing information, the mobile nodes can be aware of when to attempt to listen to a specific relay node for measuring the link with the relay node and the other relay nodes can stop transmissions at this time. In this example and as a minimum, the transmissions only need to be stopped over the spectrum resource that is used for transmitting the sounding signal. For example, the relay node may stop uplink and/or downlink and/or sidelink transmission based on the timing information when these links would interference with the sounding signal. While stopping all uplink transmissions or all downlink transmissions or both is a possible implementation, in some cases it may not be desirable to stop all communications for the relevant mobile nodes in the cell, e.g. potentially for all mobile nodes in the cell. On the other hand, in other examples, only mobile nodes involved in a device to device ("D2D") setup would stop transmissions. In the context of D2D, the term "sidelink" thus include terminal to terminal communication. More generally, in the context of the present disclosure, "sidelink" can refer to any direct link between mobiles nodes such that the communications is not routed via the base station through uplink and downlink, e.g. a terminal-terminal link, terminal-relay link or relay-relay link. If for example a system includes three relay nodes RN1, RN2 and RN3, the base station can identify three time intervals t1, t2 and t3, respectively, for detecting and measuring the relay nodes. During the time period t1, RN2 and RN3 remain silent, optionally all the other mobile nodes can also remain silent and/or the base station can remain silent, and RN1 emits a signal which will be referred to as a "sounding signal". The mobile nodes can then attempt to detect the sounding signal and to measure the signal to detect RN1. Then, at time slot t2, the relevant mobile nodes and/or bases station can remain silent while RN2 emits its sounding signal for the other mobile nodes to detect and possibly measure. Likewise, at time slot t3, the relevant mobile nodes and/or bases station can remain silent while RN3 emits its sounding signal for the other mobile nodes to detect and possibly measure. In such an arrangement, the sounding signal can serve both as a discovery or detection signal and as a signal to be measured for the link quality measurements. The base station can for example transmit the timing information which thus enables each RN to emit a sounding signal in a round-robin arrangement where they each take their turn.

In another example, the relay nodes coordinate among themselves regarding how a round-robin arrangement for sending the sounding signal would be established. In this case, the base station only communicates the measurement request but no timing information. Once the relay nodes discover all the other relay nodes in the vicinity they can coordinate on the order of transmissions so that all the other relays remain silent when one relay is transmitting its sounding signal. In the event that one or more terminals may also make measurements based on sounding signals coordinated in this way, one or more of the relay nodes may communicate to one or more terminals timing information regarding the sounding signals. In this case, a terminal in such a network can time its measurements based on the timing information provided by the relay node(s), for example in a manner similar to when similar timing information is provided by a base station. A combination of this arrangement and of the arrangement discussed above may also be implemented such that the relay nodes and/or terminals may then receive timing information from one or more base stations and/or timing information from one or more relay nodes.

As the skilled person will understand, a mobile node making the measurement will make the measurements in the downlink link with the relay node as it will be based on what the mobile node receives from the measured relay. Of course, in the case of RN-RN links, one relay node will make measurements for one direction while the other relay node will make the measurement for the link in the other direction such that both directions will be covered. In the case of a terminal-base station links, conventional uplink and/or downlink measurements may be used. Likewise, in the case of an up-link terminal-relay node or relay node-base station, any appropriate measurement method may be used. As a result, the network can estimate the quality of the links between different elements in the system and can use this information when determining which route(s) to use for transmissions, for example using algorithms and methods based on the graph theory.

Also, the threshold parameter for determining the reporting set for each mobile node may be set as appropriate. The threshold parameter may be set high to ensure the reporting only of links that would actually have benefit of being edges in the graph to be established. In some other cases, the threshold parameter may be set to zero or to minus infinity to provide information on all the discoverable links. Furthermore, all mobile nodes may have the same threshold parameter, or all mobile nodes of the same type (e.g. terminals, relay nodes, etc.) can share the same threshold parameter, threshold parameters may be set on a per-mobile node basis, or the threshold parameters may be set using any combination of these. For example, in the methods illustrated in FIGS. 10 and 11, two different threshold parameters are used, $q_{UE}$ for terminals and $q_{node}$ for relay nodes.

Even though the mobiles nodes can all operate in a similar manner, in some examples the terminals may be configured to operate differently from the base stations. For example, relay nodes are less likely to change location than terminals such that it may be decided that the terminal will carry out measurements and report on these measurements of their links with the relay nodes more frequently than the relay nodes. Also, as mentioned before, they may have different parameters, such as different thresholds for reporting the quality of a link.

Additionally, even though relay nodes and terminals are generally different elements and have been generally presented as separate elements herein, they can in some cases be provided as a single element. For example, in a D2D system, a terminal can operate as a relay and assist another terminal with uplink and/or downlink transmissions with a base station. In this case, such a D2D terminal can be considered as both a terminal and a relay node. As a result, it may be included in the measurement set and other terminals may measure the quality of the link with this D2D terminal. As mentioned above, the links between D2D terminals can be referred to as sidelinks.

As used herein, transmitting information or a message to an element may involve sending one or more messages to the element and may involve sending part of the information separately from the rest of the information. The number of "messages" involved may also vary depending on the layer or granularity considered.

Whenever the expressions "greater than" or "smaller than" or equivalent are used herein, it is intended that they discloses both alternatives "and equal to" and "and not equal to" unless on alternative is expressly excluded.

It is noteworthy that even though the present disclosure has been discussed in the context of LTE, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

The following numbered clauses define various further aspects and features of the present technique:

Clause 1. A method of obtaining link measurements in a mobile telecommunications system, the system comprising a base station configured to communicate with at least one terminal and one or more relay nodes configured to relay downlink and/or uplink transmissions between the at least one terminal and the base station, the method comprising:

sending, by the base station and to a mobile node, measurement instructions wherein the measurement instructions comprise a list identifying one or more relay nodes for measuring link quality, wherein the mobile node is one of the at least one terminal and the one or more relay nodes;

receiving, at the base station and from the mobile node, a list of one or more link measurements, wherein a link measurement measures a link quality for a link between the mobile node and one of the relay nodes identified in the list sent by the base station.

Clause 2. A method according to clause 1, wherein the measurement instructions comprise a threshold parameter for evaluating link quality.

Clause 3. A method according to clause 1 or 2, wherein receiving the list of one or more link measurements comprises receiving, in the list of one or more link measurements, a report for a link measurement only in the event that the link measurement is above a threshold parameter.

Clause 4. A method according to any preceding clause, the method comprising sending the measurement instructions to the mobile node and to another mobile node, wherein the measurement instructions are sent to the mobile node and to the another mobile node either at the same time or separately.

Clause 5. A method according to any preceding clause, wherein the list identifying the one or more relay nodes includes timing information for at least one relay node, the timing information identifying a timing for measuring the link quality with the at least one relay node.

Clause 6. A method according to any preceding clause, wherein the measurement instructions comprise a first threshold parameter for configuring the mobile node to report a link measurement only in the event that the link measurement is above the first threshold parameter.

Clause 7. A method according to clause 6, wherein the measurement instructions comprise a second threshold parameter for configuring another one of the mobile nodes to report link measurement only in the event that the link measurement is above the second threshold parameter.

Clause 8. A method according to clause 6 or 7, wherein the first threshold parameter is for configuring a plurality of the mobile nodes.

Clause 9. A method according to any preceding clause, wherein sending, by the base station and to the mobile nodes, measurement instructions comprises sending first measurement instructions to a first sub-set of the mobile nodes; and sending second measurement instructions to a second sub-set of the mobile nodes, wherein the second sub-set is different from the first sub-set.

Clause 10. A base station for obtaining link measurements in a mobile telecommunications system, the system comprising the base station being configured to communicate with at least one terminal and one or more relay nodes configured to relay downlink and/or uplink transmissions between the at least one terminal and the base station, the base station being configured to:

send, to a mobile node, measurement instructions wherein the measurement instructions comprise a list identifying one or more relay nodes for measuring link quality, wherein the mobile node is one of the at least one terminal and the one or more relay nodes;

receive, from the mobile node, a list of one or more link measurements, wherein a link measurement measures a link quality for a link between the mobile node and one of the relay nodes identified in the list sent by the base station and wherein, the mobile node is configured to report a link measurement only in the event that the link measurement is above a threshold.

Clause 11. Circuitry for a base station for obtaining link measurements in a mobile telecommunications system, the system comprising the base station being configured to communicate with at least one terminal and one or more relay nodes configured to relay downlink and/or uplink transmissions between the at least one terminal and the base station, wherein the circuitry comprises a controller element and a transceiver element configured to operate together to:

send, to a mobile node, measurement instructions wherein the measurement instructions comprise a list identifying one or more relay nodes for measuring link quality, wherein the mobile node is one of the at least one terminal and the one or more relay nodes;

receive, from the mobile node, a list of one or more link measurements, wherein a link measurement measures a link quality for a link between the mobile node and one of the relay nodes identified in the list sent by the base station and wherein, the mobile node is configured to report a link measurement only in the event that the link measurement is above a threshold.

Clause 12. A method of reporting link quality, in a mobile telecommunications system, the system comprising a base station configured to communicate with at least one terminal and one or more relay nodes configured to relay downlink and/or uplink transmissions between the at least one terminal and the base station, wherein the method is for reporting link quality at a mobile node, a mobile node being one of the at least one terminal and the one or more relay nodes, and comprises:

receiving measurement instructions from the base station, wherein the measurement instructions comprise a list identifying one or more relay nodes for measuring link quality;

generating a measurement report by, for each of the one or more relay nodes identified in the list and different from the mobile node:

(a) attempting a discovery process for the relay node;
(b) in the event that the relay node has been discovered, measuring the link quality between the mobile node and the relay node; and reporting, to the base station, a link quality indicator for each discovered relay node for which the measured link quality is above a threshold.

Clause 13. A method according to clause 12, wherein the list identifying the one or more relay nodes includes timing information for at least one relay node, the timing information identifying a timing for measuring the link quality with the at least one relay node, wherein, in the event that the last least one relay node has been discovered, the link quality between the mobile node and the at least one relay node is measured at a time selected based on the timing information.

Clause 14. A mobile node for reporting link quality, in a mobile telecommunications system, the system comprising a base station configured to communicate with at least one terminal and one or more relay nodes configured to relay downlink and/or uplink transmissions between the at least one terminal and the base station, wherein the mobile node is one of the at least one terminal and the one or more relay nodes, is configured to:

receive measurement instructions from the base station, wherein the measurement instructions comprise a list identifying one or more relay nodes for measuring link quality;

generate a measurement report by, for each of the one or more relay nodes identified in the list and different from the mobile node:

(a) attempt a discovery process for the relay node; and
(b) in the event that the relay node has been discovered, measure the link quality between the mobile node and the relay node; and report, to the base station, a link quality indicator for each discovered relay node for which the measured link quality is above a threshold.

Clause 15. Circuitry for a mobile node for reporting link quality, in a mobile telecommunications system, the system comprising a base station configured to communicate with at least one terminal and one or more relay nodes configured to relay downlink and/or uplink transmissions between the at least one terminal and the base station, wherein the mobile node is one of the at least one terminal and the one or more relay nodes and wherein the circuitry comprises a controller element and a transceiver element configured to operate together to:

receive measurement instructions from the base station, wherein the measurement instructions comprise a list identifying one or more relay nodes for measuring link quality;

generate a measurement report by, for each of the one or more relay nodes identified in the list and different from the mobile node:

(a) attempt a discovery process for the relay node;
(b) in the event that the relay node has been discovered, measure the link quality between the mobile node and the relay node; and report, to the base station, a link quality indicator for each discovered relay node for which the measured link quality is above a threshold.

Clause 16. A method of generating a signal for link measurement reports in a mobile telecommunications system, the system comprising a base station configured to communicate with at least one terminal and one or more relay nodes configured to relay downlink and/or uplink transmissions between the at least one terminal and the base station, wherein the method is for generating a signal at a first relay node, the method comprising:

receiving, at the first relay node, measurement instructions from the base station, wherein the measurement instructions comprise a list identifying at least the first relay node for measuring link quality;

identifying a timing for measuring link quality with the first relay node;

generating a sounding signal at the first relay node and at a time corresponding to the timing for measuring link quality with the first relay node.

Clause 17. A method according to clause 16, wherein the measurement instructions comprise timing information identifying the timing for measuring link quality with the first relay node.

Clause 18. A method according to clause 16 or 17, wherein identifying a timing for measuring link quality with the first relay node comprises negotiating measurement timing for measurement with at least one other relay node in the list.

Clause 19. A method according to any of clauses 16-18, wherein the timing information identifies a timing for measuring link quality with a second relay node and wherein the method comprises:

stopping sidelink transmissions at a time corresponding to the timing for measuring link quality with the second relay node.

Clause 20. A relay node for generating a signal for link measurement reports in a mobile telecommunications system, the system comprising a base station configured to communicate with at least one terminal and one or more relay nodes configured to relay downlink and/or uplink transmissions between the at least one terminal and the base station, wherein the relay node is one of the one or more relay nodes and is configured to:

receive, at the first relay node, measurement instructions from the base station, wherein the measurement instructions comprise a list identifying at least the first relay node for measuring link quality and comprise timing information identifying a timing for measuring link quality with the first relay node;

generate a sounding signal at the first relay node at a time corresponding to the timing for measuring link quality with the first relay node.

Clause 21. Circuitry for a relay node for generating a signal for link measurement reports in a mobile telecommunications system, the system comprising a base station configured to communicate with at least one terminal and one or more relay nodes configured to relay downlink and/or uplink transmissions between the at least one terminal and the base station wherein the relay node is one of the one or more relay nodes and wherein the circuitry comprises a controller element and a transceiver element configured to operate together to:

receive, at a relay node measurement instructions from the base station, wherein the measurement instructions comprise a list identifying at least the first relay node for measuring link quality and comprise timing information identifying a timing for measuring link quality with the first relay node;

generate a sounding signal at the first relay node at a time corresponding to the timing for measuring link quality with the first relay node.

REFERENCES

[1] Holma H. and Toskala A., "LTE for UMTS OFDMA and SC-FDMA Based Radio Access", John Wiley & Sons Limited, January 2010.

The invention claimed is:

1. A method of obtaining link measurements in a mobile telecommunications system, the mobile telecommunications system comprising a base station configured to communicate with at least one terminal and one or more relay nodes configured to relay downlink and/or uplink transmissions between the at least one terminal and the base station, the method comprising:

sending, by the base station and to a mobile node, measurement instructions for measuring a link quality, wherein the measurement instructions comprise a list identifying at least a first relay node and a second relay node and timing information identifying a first timing for measuring a first link quality with the first relay node and a second timing for measuring a second link quality with the second relay node, wherein the mobile node is one of the at least one terminal and the one or more relay nodes, the first relay node transmits a first sounding signal in first communication resources at the first timing, the second relay node transmits a second sounding signal in second communication resources at the second timing, the first relay node does not transmit in the second communication resources at the second timing, and the second relay node does not transmit in the first communication resources at the first timing;

measuring, at the mobile node, the first link quality and the second link quality;

determining, at the mobile node, whether the first link quality and the second link quality exceed a threshold parameter, wherein the threshold parameter is determined based on a type of the mobile node, and different values of the threshold parameter are assigned by the base station to different types of mobile nodes; and receiving, at the base station and from the mobile node, a list of one or more link measurements indicating the link quality for only those links determined to have a respective link quality that exceeds a respective threshold parameter, wherein the link quality indicated in the list of one or more link measurements is determined at least in part by measuring the first sounding signal during the first timing and the second sounding signal during the second timing, wherein, in a case that the mobile node is a relay node type, a first value of the threshold parameter is assigned by the base station, and wherein, in a case that the mobile node is a terminal type, a second value of the threshold parameter different from the first value is assigned by the base station.

2. The method according to claim 1, the method comprising sending the measurement instructions to the mobile node and to another mobile node, wherein the measurement instructions are sent to the mobile node and to the another mobile node either at the same time or separately.

3. The method according to claim 1, wherein the measurement instructions comprise a second threshold parameter for configuring another one of the mobile nodes to report link measurement only in the event that the link measurement is above the second threshold parameter.

4. The method according to claim 1, wherein the threshold parameter is for configuring a plurality of the mobile nodes.

5. The method according to claim 1, wherein sending, by the base station and to the mobile node, measurement instructions comprises:

sending first measurement instructions to a first sub-set of the mobile nodes; and sending second measurement instructions to a second sub-set of the mobile nodes, wherein the second sub-set is different from the first sub-set.

6. The method according to claim 1, wherein the mobile node is configured to measure a first strength of the first sounding signal in response to detecting the first sounding signal during the first timing, and to measure a second strength of the second sounding signal in response to detecting the second sounding signal during the second timing.

7. The method according to claim 1, wherein the base station is connected directly to a core network, and the one or more relay nodes are not connected directly to the core network.

8. The method according to claim 1, wherein the measurement instructions further comprise at least one of: a number of times to measure the link quality, an indication of whether to take an average of multiple measurements of the link quality, and an indication of whether to measure the link quality across a full bandwidth.

9. Circuitry for a base station for obtaining link measurements in a mobile telecommunications system, the mobile telecommunications system comprising the base station being configured to communicate with at least one terminal and one or more relay nodes configured to relay downlink and/or uplink transmissions between the at least one terminal and the base station, wherein the circuitry comprises a controller element and a transceiver element configured to operate together to:

send, to a mobile node, measurement instructions for measuring a link quality wherein the measurement instructions comprise a list identifying at least a first relay node and a second relay node and timing information identifying a first timing for measuring a first link quality with the first relay node and a second timing for measuring a second link quality with the second relay node, wherein the mobile node is one of the at least one terminal and the one or more relay nodes, the first relay node transmits a sounding signal in first communication resources at the first timing, the second relay node transmits a sounding signal in second communication resources at the second timing, the first relay node does not transmit in the second communication resources at the second timing, and the second relay node does not transmit in the first communication resources at the first timing; and measure, at the mobile node, the first link quality and the second link quality;

determine, at the mobile node, whether the first link quality and the second link quality exceed a threshold parameter, wherein the threshold parameter is determined based on a type of the mobile node, and different values of the threshold parameter are assigned by the base station to different types of mobile nodes; and receive, from the mobile node, a list of one or more link measurements indicating a link quality for only those links determined to have a respective link quality that exceeds a respective threshold parameter, wherein the link quality indicated in the list of one or more link measurements is determined at least in part by measuring at least one of the first sounding signal during the first timing and the second sounding signal during the second timing, wherein, in a case that the mobile node is a relay node type, a first value of the threshold parameter is assigned by the base station, and wherein, in a case that the mobile node is a terminal type, a second value of the threshold parameter different from the first value is assigned by the base station.

10. A method of reporting link quality, in a mobile telecommunications system, the mobile telecommunications system comprising a base station configured to communicate with at least one terminal and one or more relay nodes configured to relay downlink and/or uplink transmissions between the at least one terminal and the base station, wherein the method is for reporting link quality at a mobile node, a mobile node being one of the at least one terminal and the one or more relay nodes, and comprises:

receiving measurement instructions from the base station, wherein the measurement instructions comprise a list identifying one or more relay nodes for measuring link quality;

generating a measurement report by, for each of the one or more relay nodes identified in the list and different from the mobile node:

(a) attempting a discovery process for the relay node at a timing specified by the base station in the measurement instructions;

(b) in a case that the relay node has been discovered and in response to discovering the relay node, measuring the link quality between the mobile node and the relay node;

(c) in a case that the link quality has been measured, determining whether the measured link quality between the mobile node and the relay node exceeds a threshold parameter, wherein the threshold parameter is determined based on a type of the mobile node, and different values of the threshold parameter are assigned by the base station to different types of mobile nodes;

(d) in response to determining that the link quality exceeds the threshold parameter, including a link quality indicator for the relay node in the measurement report; and (e) in response to determining that the link quality is below the threshold parameter, not including the link quality indicator for the relay node in the measurement report; and reporting, to the base station, the measurement report, wherein, in a case that the mobile node is a relay node type, a first value of the threshold parameter is assigned by the base station, and wherein, in a case that the mobile node is a terminal type, a second value of the threshold parameter different from the first value is assigned by the base station.

11. The method according to claim 10, wherein the list identifying the one or more relay nodes includes timing information for at least one relay node, the timing information identifying a timing for measuring the link quality with the at least one relay node, and in the case that the at least one relay node has been discovered, the link quality between the mobile node and the at least one relay node is measured at a time selected based on the timing information.

12. A mobile node for reporting link quality, in a mobile telecommunications system, the mobile telecommunications system comprising a base station configured to communicate with at least one terminal and one or more relay nodes configured to relay downlink and/or uplink transmissions between the at least one terminal and the base station, wherein the mobile node is one of the at least one terminal and the one or more relay nodes, is configured to:

receive measurement instructions from the base station, wherein the measurement instructions comprise a list identifying one or more relay nodes for measuring link quality;

generate a measurement report by, for each of the one or more relay nodes identified in the list and different from the mobile node:

(a) attempt a discovery process for the relay node at a timing specified by the base station in the measurement instructions;

(b) in a case that the relay node has been discovered and in response to discovering the relay node, measure the link quality between the mobile node and the relay node; and (c) in a case that the link quality has been measured, determine whether the measured link quality between the mobile node and the relay node exceeds a threshold parameter, wherein the threshold parameter is determined based on a type of the mobile node, and different values of the threshold parameter are assigned by a base station to different types of mobile nodes;

(d) in response to determining that the link quality exceeds the threshold parameter, include a link quality indicator for the relay node in the measurement report; and (e) in response to determining that the link quality is below the threshold parameter, exclude the link quality indicator for the relay node from the measurement report; and report, to the base station, the measurement report, wherein, in a case that the mobile node is a relay node type, a first value of the threshold parameter is assigned by the base station, and wherein, in a case that the mobile node is a terminal type, a second value of the threshold parameter different from the first value is assigned by the base station.

13. A method of generating a signal for link measurement reports in a mobile telecommunications system, the mobile telecommunications system comprising a base station configured to communicate with at least one terminal and one or more relay nodes configured to relay downlink and/or uplink transmissions between the at least one terminal and the base station, wherein the method is for generating a signal at a first relay node, the method comprising:

receiving, at the first relay node, measurement instructions from the base station, wherein the measurement instructions comprise a list identifying at least the first relay node for measuring a first link quality, wherein the measurement instructions comprise timing information identifying a timing for measuring a second link quality with a second relay node;

identifying a timing for measuring the first link quality with the first relay node;

generating a sounding signal at the first relay node and at a time corresponding to the timing for measuring the first link quality with the first relay node;

stopping sidelink transmissions at a time corresponding to the timing for measuring the second link quality with the second relay node;

measuring, at the first relay node, the first link quality and the second link quality;

determining, at the first relay node, whether the first link quality and the second link quality exceed a threshold parameter, wherein the threshold parameter is determined based on a type of the relay node, and different values of the threshold parameter are assigned by the base station to different types of relay nodes; and receiving, at the base station and from the first relay node, a list of link measurements indicating the link quality for only those links determined to have a respective link quality that exceeds a respective threshold parameter, wherein the first link quality comprises a measurement of the sounding signal made during the timing for measuring the first link quality, wherein, in a case that the relay node is a terminal type, a first value of the threshold parameter is assigned by the base station, and wherein, in a case that the relay node is not the terminal type, a second value of the threshold parameter different from the first value is assigned by the base station.

14. The method according to claim 13, wherein the measurement instructions comprise timing information identifying the timing for measuring the first link quality with the first relay node.

15. The method according to claim 13, wherein identifying the timing for measuring the first link quality with the first relay node comprises negotiating measurement timing for measurement with at least one other relay node in the list.

16. Circuitry for a relay node for generating a signal for link measurement reports in a mobile telecommunications system, the mobile telecommunications system comprising a base station configured to communicate with at least one terminal and one or more relay nodes configured to relay downlink and/or uplink transmissions between the at least one terminal and the base station, wherein the circuitry comprises a controller element and a transceiver element configured to operate together to:

receive, at the relay node measurement instructions from the base station, wherein the measurement instructions comprise a list identifying the relay node for measuring a first link quality and timing information identifying a timing for measuring the first link quality with the relay node and a timing for measuring a second link quality with a second relay node;

generate a sounding signal at the relay node at a time corresponding to the timing for measuring the first link quality with the relay node;

stop sidelink transmissions at a time corresponding to the timing for measuring the second link quality with the second relay node;

measure, at the relay node, the first link quality and the second link quality;

determine, at the relay node, whether the first link quality and the second link quality exceed a threshold parameter, wherein the threshold parameter is determined based on a type of the relay node, and different values of the threshold parameter are assigned by the base station to different types of relay nodes; and receive, at the base station and from the relay node, a list of link measurements indicating the link quality for only those links determined to have a respective link quality that exceeds a respective threshold parameter, wherein the first link quality comprises a measurement of the sounding signal made during the timing for measuring the first link quality, wherein, in a case that the relay node is a terminal type, a first value of the threshold parameter is assigned by the base station, and wherein, in a case that the relay node is not the terminal type, a second value of the threshold parameter different from the first value is assigned by the base station.

* * * * *